May 22, 1951 L. BRYAN 2,554,453
FIELD MOLD FOR COATING PIPE
Filed April 27, 1949 2 Sheets-Sheet 1

INVENTOR
Lloyd Bryan
BY:
ATTORNEYS

May 22, 1951 — L. BRYAN — 2,554,453
FIELD MOLD FOR COATING PIPE
Filed April 27, 1949 — 2 Sheets-Sheet 2

INVENTOR
Lloyd Bryan
BY: J. H. Adams
Walter G. Miller
Ralph C. Freeland Jr.
ATTORNEYS Patented May 22, 1951

2,554,453

UNITED STATES PATENT OFFICE 2,554,453

FIELD MOLD FOR COATING PIPE

Lloyd Bryan, Bartlesville, Okla., assignor to California Research Corporation, San Francisco, Calif., a corporation of Delaware Application April 27, 1949, Serial No. 89,925

6 Claims. (Cl. 18—36)

This invention relates to apparatus for applying a thick layer of plastic material, such as a bituminous or cementitious plastic, to form a thick coating on a relatively short length of pipe, or the like, and more particularly relates to an apparatus for applying such a coating to those portions of a coated pipe which have been left bare to facilitate coupling of the abutting ends of the pipe sections to form a continuous pipeline.

In Postlewaite Patent No. 2,040,876, issued May 19, 1936, there is disclosed a method and apparatus for coating pipe and the like with a coating of an initially plastic material to prevent corrosion of the pipe. Such a coating operation is preferably continuous, that is, lengths or sections of pipe are coupled together and successively forced through the coating apparatus so that a continuous coating is formed. In Postlewaite Patent No. 2,334,577, issued November 16, 1943, there is disclosed apparatus for scoring coated pipe, such as that received from the above-mentioned pipe coating apparatus, adjacent the coupling members in order to remove a portion of the relatively thick coating for a few inches from the ends of the separate lengths, so that when the pipe is coupled together in a continuous pipeline, the individual joints may be welded or otherwise secured together. After the coated pipe has been connected, the gaps thus formed in the otherwise continuous coating must be covered with corrosion-resisting or other desired material, preferably having the same characteristics as that forming the coating of the main body of the pipe. These so-called field joints are preferably made by apparatus which is portable so that it and the material to be applied thereto may be transported easily over the length of the pipeline. It is desirable that the apparatus for applying the coating to these field joints be capable of exerting a considerable pressure on the initially plastic coating compound. This is desirable not only to secure a firm bond between the bare pipe and the material to be applied, but also to insure that the coating layer will be dense and homogeneous so as to be equally corrosion-resistant with the remainder of the coating on the line.

It is an object of this invention to provide an easily portable mold adapted to apply a plastic material, such as a pipe coating, to the relatively short length of a pipeline and to make a waterproof and homogeneous bond between the coating so applied and the pipe, as well as with the ends of the coating previously applied to the pipe.

Another object of the invention is to provide an apparatus for applying field joints to coated pipe, which apparatus may be readily connected and disconnected from the section of the line to be coated, so that more rapid application of field joints may be made.

A still further object of the present invention is to provide a portable cylindrical mold for field joints which may be used to make field joints faster and economically cheaper than previously known methods for coating such joints.

A further object is to provide a portable mold for field joints which may be actuated by fluid pressure.

Still a further object of the invention is to provide apparatus for coating field joints wherein an excess of the coating material may be loaded into a receiver or storage hopper without regard to the amount of material required for a single mold, but only the required amount of material for the mold is admitted to the mold-forming section of the device.

Further objects and advantages will become apparent from the following description and the accompanying drawings which form a part of this specification and illustrate a preferred embodiment of the invention.

Figure 1:
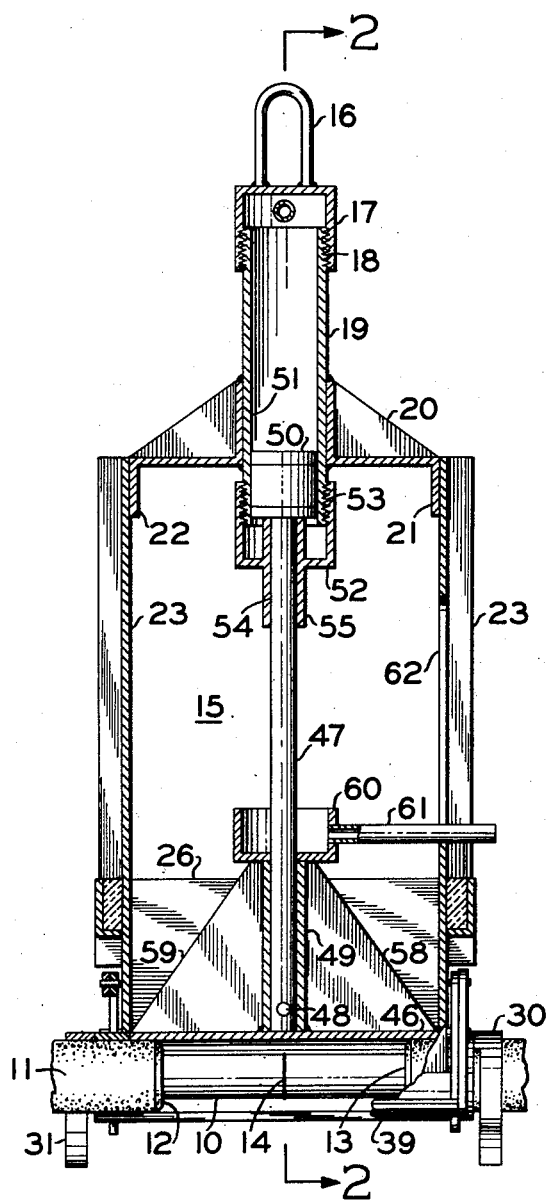
Fig. 1 is a partial cross-sectional, side elevation view of pipe coating apparatus according to the present invention, showing the mold assembled around a section of pipeline prior to the coating operation of the machine.

Referring now to the drawings, and in particular Fig. 1, reference numeral 10 designates a pipeline which has been coated with an initially plastic material 11, such as the bituminous mastic of the C. S. McDonald et al. Patent 1,984,649, issued December 18, 1934, which comprises a graded mineral aggregate and a small proportion of a bituminous substance, such as asphalt. During the process of fabricating pipeline 10, coating 11 has been removed or omitted from the short section of the pipe between ends 12 and 13, so that the pipeline 10 may be fabricated from short sections and joined together, such as by weld 14. After the sections of the pipe have been welded or otherwise joined together, it is desirable to provide a coating for the joints of similar properties to coating 11 so that the portion of the pipeline 10 between the ends 12 and 13 will have a homogeneous coating. In order to provide the coating operation of the field joints, the field joint apparatus designated generally as 15, having a longitudinal dimension along the pipeline slightly greater than the bared section of the pipe, is seated on the previously-applied coating material 11, so that the uncoated portion between ends 12 and 13 is bridged by apparatus 15.

To provide the desired portability of the field joint apparatus 15 so that the molding operation may be repeatedly performed at each field joint along the length of several miles of pipeline, the entire apparatus is arranged to be transported by any conventional type of portable equipment, such as a truck or tractor, having a crane boom and a lifting hook. Accordingly, a bail 16 is provided to cooperate with the hook on the movable equipment (not shown) and is preferably welded as shown to the top cap, or cylinder head 17, which in turn is screwed by suitable threads 18 into engagement with the upper end of cylinder 19. Cylinder 19, in turn, forms the main support for the remainder of field joint apparatus 15. An upper supporting bracket, indicated generally as 20, is provided to support the sides and lower portion of the mold and is welded to the cylinder 19 as indicated by welds above and below the bore through which cylinder 19 extends. Upper supporting bracket 20 is provided with a pair of downwardly turned flanges 21 and 22 to which the side supports 23 are connected. These side supports likewise form the end portion of the receptacle, or hopper, 24, wherein the coating material is loaded. The longitudinally extended portion of hopper 24 is provided by angularly extending side members, or walls, 25 and 26, best seen in Fig. 2.

Since the coating material may be of the thermoplastic type and applied at temperatures up to 300°–400° F., insulation 27 may be provided in recesses within the hollow portions of the longitudinally extending walls 25 and 26 to prevent cooling. Walls 25 and 26 likewise support two stationary segments of the mold formed by curved sections 28 and 29. It will be apparent that the entire mold apparatus 15 may be lowered until segments 28 and 29 contact the ends of the previously applied coating 11 of pipe 10. A pair of U-shaped saddles or guides 30 and 31 are mounted by any suitable means, such as welding, on opposite sides of the lower ends of the end members of hopper 24 to provide guiding means to assist in the lining up of the mold over the uncoated joint.

Figure 3:
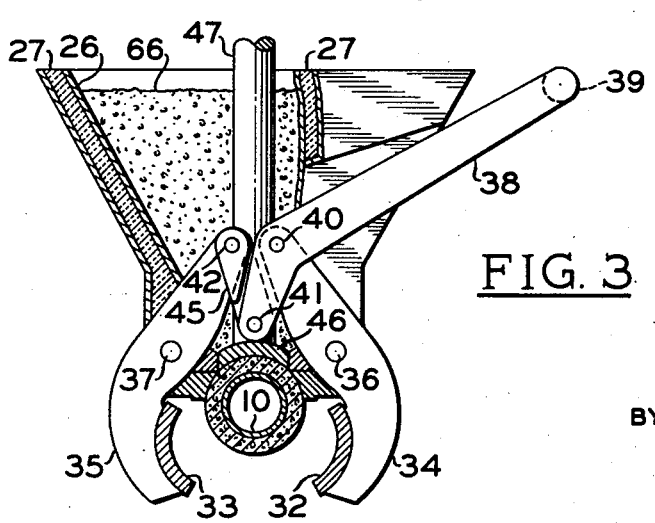
Fig. 3 is an end elevation view, partially in section, of the mold lowered into position over the pipe before the coating operation.

In order to provide the lower segments of the mold, which may be moved into position after the fixed segments 28 and 29 are in contact with the ends of the pipe coating 11, a pair of longitudinally extending arcuate segments 32 and 33 are mounted upon hinged arms 34 and 35, respectively, adapted to pivot about pins 36 and 37, which are likewise mounted upon each of the end members of hopper 24 by any suitable means, such as welding. Arms 34 and 35 are arranged simultaneous actuation by handle 38 and operating bar 39 through a self-locking toggle joint provided by pins 40, 41 and 42 and the linkage arm 44 between pins 41 and 42. Linkage arm 44 is provided with a stop 45 to limit the travel of the linkage arm during the opening operation of the handle 38 and operating bar 39 (Figure 3). It will be readily apparent that, for parallel operation of segments 32 and 33, arms 34 and 35 and handle 38 will be similar at the opposite sides of the mold 15 and the opposite handles 38 connected to the common operating bar 39.

The upper and final closing section of the mold is provided by an arcuate segment 46 which is mounted for extension and retraction upon rod 47 by pin 48 passing through a hole in rod 47 and hub 49, which is welded to segment 46. A pair of triangular shaped gusset sections 58 and 59 may be provided between hub 49 and the upper surface of segment 46 in order to prevent bending and also to transfer the desired compressional force from the rod 47 along the length of segment 46 during the molding operation. At the upper end of rod 47 a piston 50, adapted for reciprocating motion within bore 51 of cylinder 19, is provided for power actuation of the upper segment 46. Cylinder 19 is closed at the lower end by a lower cylinder head 52 through screw threads 53 which engage similar threads in the lower portion of cylinder 19. Cylinder head 52 likewise provides an upper bearing surface for rod 47 by means of bore 54 in the extended portion 55 of the cylinder head 52. To provide the operating fluid pressure for piston 50 and cylinder 19, a pair of inlet and outlet lines 56 and 57 leading to suitable control valves and a source of pressure fluid (not shown) communicate with cylinder heads 17 and 52, respectively. A drip cup 60, mounted upon hub 49, may be provided, and is illustrated as being vented to the outside of the mold hopper 24 through a tube 61, which extends between the cup and the outside of the hopper through a slot 62 in side wall 23 to conduct away from the hopper any operating fluid that might leak from cylinder 19 between bore 54 and rod 49 and thereby contaminate coating material 24. In order to control the density of the coating material during the coating operation, as will be more fully set forth hereinafter, a pair of members 63 and 64 desirably having their edge beveled, are mounted between walls 25 and 26 of the hopper 24 and the fixed segments 28 and 29, and extend longitudinally along the length of the mold.

Figure 2:
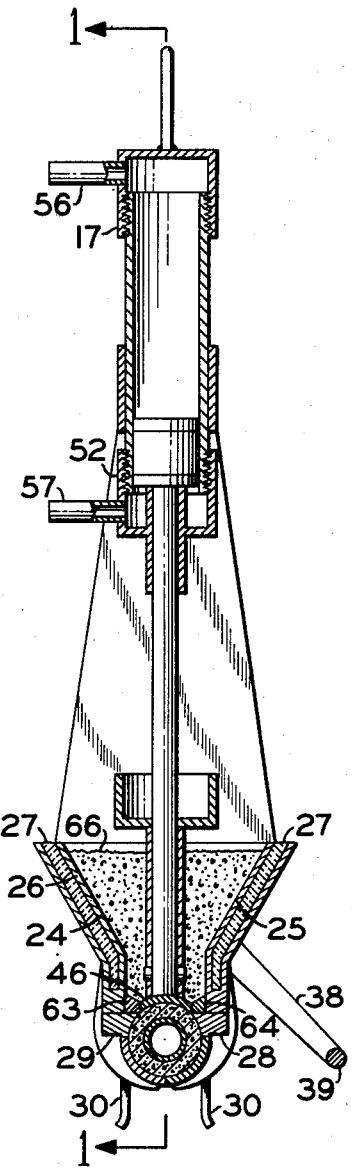
Fig. 2 is a vertical, end elevation view taken in the direction of arrows 2—2 in Fig. 1, with the hopper or receptacle for the coating material loaded in the apparatus prior to the coating operation.
Figure 5:
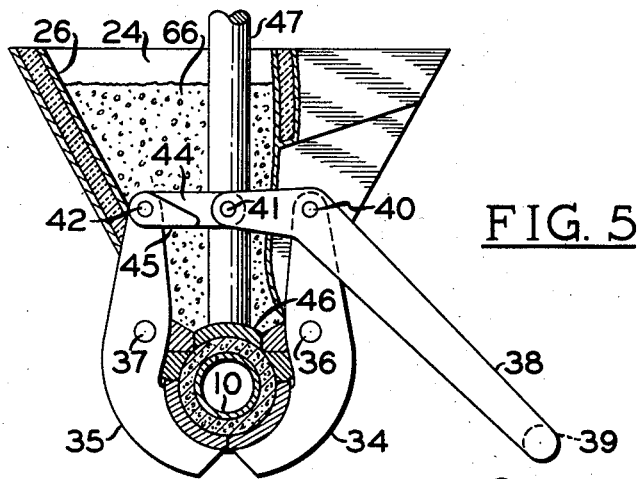
Fig. 5 is a view similar to Figs. 3 and 4, showing the completed molding operation.
Figure 4:
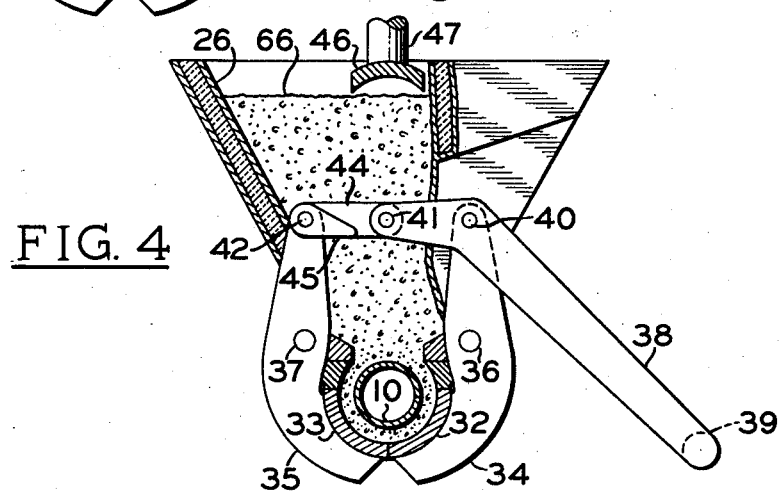
Fig. 4 is a view similar to Fig. 3, illustrating the first step in the coating operation, wherein material is admitted to the mold.

In the operation of mold 15, as stated hereinbefore, the device is lowered onto the section of the pipeline to be coated until the fixed or stationary segments 28 and 29 just touch the previously coated portion of the line, with the lower segments 32 and 33 in an opened position, as shown in Fig. 3, and with the ram or upper segment 46 in a lowered, or extended, position as in Fig. 2. Handle 38 is then depressed so that the movable arms 34 and 35 carrying lower segments 32 and 33 are pivoted into the position shown in Fig. 4, so that the lower portion of the generally cylindrical mold form is completed. The initially plastic coating material 66 may then be added to receptacle, or hopper, 24, and the upper segment 46 retracted by introducing operating fluid pressure through line 57 to move piston 50 and rod 47 into its upper, or retracted, position. In this way plastic coating material 66 is permitted to enter the lower portion of the mold formed by stationary segments 28 and 29 and hinged segments 32 and 33 under the force of gravity. As shown in Figs. 2 and 5, upper segment or ram 46 is then forced down through the coating material by venting line 57 and introducing fluid pressure through line 56 to cylinder 19 to force piston 50 and rod 47 downward. Through the interaction of the sections 63 and 64, cooperating with ram 46, the desired amount of coating material may be forced into the mold and the remainder of the coating material 66 in hopper 24 may be excluded from the mold. It will be apparent that the distance along the vertical portion of members 63 and 64 through which ram 46 passes will determine the total volume of the material in the mold at the time ram 46 acts to cut off the flow of material from hopper 24 into the mold proper.

After permitting the mold to remain closed for the coating material 66 to harden, to an extent that it will remain on pipe 10, bar 39 and handles 38 are raised to the position shown in Fig. 3, thereby disengaging the lower pivoted segments 32 and 33 and permitting the whole apparatus 15 to be raised, with upper segment or ram 46 remaining in its extended or lowered position to prevent the undesired escape of the coating material 66 remaining in hopper 24. The entire mold apparatus 15 may then be moved to the next field joint and the coating operation repeated. By the use of hopper 24, and the metering function of ram 46, it will be apparent that material may be added intermittently as required without the necessity of measuring out the exact quantity required for a single joint and the consequent waste of material normally inherent in such a batch operation.

It is desirable initially to prime the bare section of pipe 10 between ends 12 and 13 of the coated line with a suitable substance that will promote a bond between the plastic material, the pipe, and the ends 12 and 13 of the coating 11 already in place on pipeline 10. In the case of a bituminous mastic, this liquid may be a bituminous emulsion or desirably a mixture of asphalt and a light petroleum solvent. To prevent sticking of the several segments of the mold to the finally coated joint, it is desirable to coat the inside of the mold segments 28, 29, 32, 33 and 46 with a parting material such as whitewash, mineral oil or vegetable oil.

It will be apparent to those skilled in the art that the configuration of the mold segments may be altered to accommodate the diameters of the pipes to be coated with this apparatus, and that the mold could be made with only three segments consisting of the pivoted segments 32 and 33 and the upper segment 46, since the stationary segments 28 and 29 only assist in the alignment of the mold and their molding function could be accomplished by increasing the arcs of the movable segments of the mold.

Other modifications and variations of the invention will be apparent to those skilled in the art and may be made without departing from the spirit and scope thereof and I intend to limit the invention only within the scope of the appended claims.

I claim:

1. A device for applying an initially plastic coating material to a bare section of pipe between the ends of a thick layer of coating which has previously been applied thereto, comprising at least three, longitudinally-extending, transversely-arcuate sections adapted to be secured around said pipe and said coating to form a mold, a receptacle for plastic coating material arranged above said mold, one of said sections being adapted to simultaneously form a bottom closure for said receptacle and cooperate with other of said sections to form the top of said mold, at least two of said other sections being hinged with respect to said receptacle for movement into and out of engagement with each other to form the bottom of said mold, and means for lifting said one section to permit said material to enter said mold and lowering said section to complete said mold.

2. A device for applying an initially plastic coating material to a bare section of pipe between the ends of a thick layer of coating which has previously been applied thereto, comprising a receptacle for said plastic material mounted upon a pair of stationary segments adapted to engage the coated ends of said pipe, said stationary segments being arcuately spaced apart to provide a bottom opening for said receptacle, an upper segment adapted to cooperate with said pair of segments to close said opening and form the upper section of said mold, a pair of segments mounted in hinged relationship to said receptacle adapted to be pivoted into engagement with said stationary segments of said mold to surround said pipe, and means for retracting said upper segment to admit said plastic material to said mold from said receptacle and returning said segment to its mold-engaging position to force said material into said mold and thereby compact said material around said pipe.

3. A device for applying an intially plastic coating material to a bare section of pipe between the ends of a thick layer of coating which has previously been applied thereto, comprising a receptacle for said coating material, a retractable closure for said receptacle having a top-mold forming segment mounted thereon, a pair of lower segments hingedly mounted in relation to said receptacle an dadapted to cooperate with each other and with said first mentioned segment to complete said mold, and means for retracting the closure segment to admit said material to the portion of the mold formed by said lower pair of segments and then forcing said closure segment into its original position to complete said mold.

4. A device for applying an initially plastic coating material to a bare section of pipe between the ends of a thick layer of coating which has previously been applied thereto, comprising a receptacle for said coating material adapted to bridge the ends of the coating already on the pipe, said receptacle having a longitudinally-extending opening in the bottom thereof, a pair of arcuate segments pivotally connected to said receptacle and movable together to form the lower portion of a substantially cylindrical mold surrounding said bare section of pipe, and a ram member movable vertically within said receptacle to force a predetermined quantity of coating material into said mold and to close the top thereof, said ram also acting to close the bottom of said receptacle to retain coating material therein when said device is removed from said pipe.

5. Apparatus for molding a coating of initially plastic material for a bare section of pipe which has previously been coated comprising a pair of stationary arcuate molding segments having a length along the pipe longer than the bare section so that the ends of said segments bridge the previously coated sections of said pipe, a hopper for said coating material mounted above said stationary segments having a longitudinally opening between said segments, a pair of hinged arcuate segments pivotally mounted adjacent the lower ends of said hopper for cooperation with said stationary segments to form the lower portion of the mold, a fluid pressure operated upper segment for simultaneously closing the opening in said hopper and closing said mold, and fluid pressure actuated cylinder and piston means for retracting said upper segment to admit said material from said hopper to said mold and extending said segment to ram the material in the mold into a compact, homogeneous mass.

6. Field joint molding apparatus for coating bare coupling joint sections of a pipeline constructed of pipe previously coated with a thick layer of material comprising a hopper for initially plastic coating material having a longitudinal opening of a greater length than the joint section to be coated, supporting means for said hopper for suspending said hopper above said section, a pair of stationary mold segments mounted along the length of said opening for seating said hopper on said pipe, a pair of hinged segments pivotally mounted upon the ends of said hopper adapted to be pivoted into cooperation with said stationary segments to form the lower portion of the mold around said pipe, an upper segment adapted to reciprocate into and out of engagement with the opening in said hopper to simultaneously close said hopper and complete said mold surrounding said pipe, and fluid pressure actuated means for reciprocating said upper segment to provide power ramming of the material within said mold.

LLOYD BRYAN.

REFERENCES CITED

The following references are of record in the file of this patent:

UNITED STATES PATENTS

| Number | Name | Date |
|---|---|---|
| 486,182 | Oakman | Nov. 15, 1892 |
| 568,298 | Croskey et al. | Sept. 22, 1896 |
| 1,683,755 | Bigelow | Sept. 11, 1928 |
| 1,941,299 | Greenidge | Dec. 26, 1933 |